(12) United States Patent
Lawes

(10) Patent No.: US 8,172,710 B1
(45) Date of Patent: May 8, 2012

(54) WHEEL MOUNTED VEHICLE TRANSMISSION

(76) Inventor: Roland Lawes, Santiago (PA)

( * ) Notice: Subject to any disclaimer, the term of this patent is extended or adjusted under 35 U.S.C. 154(b) by 1240 days.

(21) Appl. No.: 11/974,672

(22) Filed: Oct. 15, 2007

Related U.S. Application Data

(60) Provisional application No. 60/936,275, filed on Jun. 20, 2007.

(51) Int. Cl.
*F16H 47/08* (2006.01)
(52) U.S. Cl. .......................................................... 475/95
(58) Field of Classification Search ................... 475/31, 475/254, 258, 267, 95
See application file for complete search history.

(56) References Cited

U.S. PATENT DOCUMENTS

| | | | | |
|---|---|---|---|---|
| 2,687,048 A | * | 8/1954 | Butler | 74/655 |
| 2,701,481 A | * | 2/1955 | McCartin | 475/254 |
| 2,775,909 A | * | 1/1957 | Butler | 475/31 |
| 3,180,182 A | * | 4/1965 | Tiberio | 475/95 |
| 3,831,461 A | * | 8/1974 | Mueller | 475/89 |
| 4,162,713 A | | 7/1979 | Heitman et al. | 180/242 |
| 4,763,747 A | | 8/1988 | Muller | 180/244 |
| 4,943,268 A | * | 7/1990 | Eisenmann et al. | 475/95 |
| 5,525,115 A | | 6/1996 | Vanzini | 475/146 |
| 6,080,077 A | | 6/2000 | Kamlukin | 475/339 |
| 6,537,167 B1 | | 3/2003 | Gazyakan et al. | 475/5 |
| 6,672,985 B2 | | 1/2004 | Chung et al. | 475/221 |

* cited by examiner

*Primary Examiner* — David D Le
*Assistant Examiner* — Erin D Bishop
(74) *Attorney, Agent, or Firm* — Clifford Kraft

(57) ABSTRACT

An individual automatic transmission for each road wheel, independently connected to the drive shaft, so that each wheel acts without regard to the requirements of the other road wheels. With exception of some type of manual reversing system, a brake, and a gas pedal, no manually operated clutches, shift levers, or differential gearing is required. A vehicle having four road wheels has a correct torque exerted on each of the wheels as long as the drive engine is running, the intensity of which is determined by road conditions on that wheel and on the desires of the operator who controls the engine speed. Connection of each driven wheel shaft to the engine shaft can be made by bevel gears of the desired ratio and/or universal couplings.

5 Claims, 3 Drawing Sheets

WHEEL MOUNTED VEHICLE TRANSMISSION

This application is related to and claims priority from U.S. Provisional Patent Application No. 60/936,275 filed Jun. 20, 2007. Application 60/936,275 is hereby incorporated by reference.

BACKGROUND

1. Field of the Invention

The present invention relates generally to the field of vehicle transmissions and more particularly to a wheel mounted vehicle transmission.

2. Description of the Prior Art

Automatic and manual vehicle transmissions are well-known in the art. Automatic transmissions permit the drive wheels of the vehicle to adapt to varying road conditions as well as to the intentions of the vehicle operator within the limit of the power furnished by the driver engine while allowing the engine to rotate at it's most favorable speed regardless of the load it encounters. This is opposed to standard or manual transmission where the driver selects the relative rotational velocities of engine and drive wheels within the design limit. Automobile automatic transmissions can be classified as hydraulic, mechanical, or a combination of both. Mechanical systems can further be classified as geared and frictional.

The similarity between manual and automatic gear transmissions is that, in both, the ratio of engine speed and road wheel speed is incremental. The difference, is that in the case of a manual transmission, the mind of the operator decides the incremental ratio; in the automatic transmission, that ratio is determined automatically by the organization of the many variables encountered in vehicular travel.

An abrupt change in the drive gear ratio of a massive vehicle, such as an automobile, results in a shock which is hard on the mechanism of the vehicle as well as on the occupants. Consequently it is best to provide a cushion somewhere in the drive train to cause the gear ratio change to be dampened for a short period of time. The designs now in general use employ a foot pedal operated clutch in the manual transmission, and in the automatic transmission, a hydraulic pump and motor. Controlled clutch pressure or hydraulic pump pressure provides the time cushion needed to simulate continuous ratio change. Various versions of the so-called Wolfrom transmission have been proposed to serve as such a cushion, but the Industry has generally given preference to the hydraulic.

The pump and motor (turbine) connector is known as a torque converter and is designed to transmit part, or all, of the power developed by the driving engine to the road wheels as determined by the "mind" of the automatic control system.

Friction type speed changers are generally continuous but have not been accepted for vehicles having more than moderate horsepower because heat, and wear of contact surfaces results in greater maintenance of the components involved. This is due to the condition that not all points on the area of contact are rotating at the same speed and that the larger the area of contact the more slip conformity is needed.

Sensing devices of automatic transmissions determine the relationship between engine speed and vehicle velocity and apply optimum torque to the road wheels. Since these sensing devices cannot foresee road conditions in advance of the vehicle, many automatic transmissions permit the driver to manually override the sensing devices should he choose. In places where all road wheels do not rotate at the same velocity, such as on curves, some type of differential equipment is additionally installed. A skilled operator can manually equal the maneuvers of the automatic, but the average motorist benefits greatly from an automatic transmission.

Generally, automobiles equipped with 4 wheel drive use manual transmissions commonly called stick shifts. A problem with existing 4 wheel drive transmissions is that, for all wheels to have positive traction, differential gearing cannot be employed. In some designs the driver must exit the vehicle to engage the front wheel drives. Others have an inside lever which permits elimination of the differential train while the driver remains in his seat. When 4 wheel traction is no longer necessary, or at high speeds, the differentials should be re-engaged, or the front wheel drivers disconnected.

It would be advantageous to provide the desired cushion by using the time required to overcome the inertial reactance to the ratio change, together with a load required to pump oil through the wheel mounted impeller, making for continuous rather than incremental ratio change.

SUMMARY OF THE INVENTION

The present invention provides an individual automatic transmission for each road wheel, independently connected to the drive shaft, so that each wheel acts without regard to the requirements of the other road wheels. With exception of some type of manual reversing system, a brake, and a gas pedal, no manually operated clutches, shift levers, or differential gearing is required. Thus, a vehicle having four road wheels has a correct torque exerted on each of the wheels as long as the drive engine is running, the intensity of which is determined by road conditions on that wheel and on the desires of the operator who controls the engine speed. Connection of each driven wheel shaft to the engine shaft can be made by bevel gears of the desired ratio and/or universal couplings. Because typical power sources capable of propelling vehicles do not efficiently furnish high torque at low speeds (excepting steam pistons), their drive shafts are generally not directly connected to the road wheel shafts. The present invention provides a means of adjusting the required road wheel torque to the engine torque.

The components of the present invention have similar characteristics in both clockwise and counterclockwise rotation. Reverse, or backing up, thus requires a reversal of the direction of rotation of the drive shaft. If the engine or drive shaft cannot be reversed by some conventional means, some other form of drive shaft rotation reversal needs to be provided if the vehicle is to be able to back up. Any method of engine or drive shaft reversal is within the scope of the present invention.

The present invention solves the problem of a hump in the middle of a passenger car caused by the transmission. It also allows that an entire spare transmission could be stored on an auto parts shelf and replaced by a mechanic. A standardized version of the present invention could be changed out and sent for repair in about the time it takes to change a tire.

DESCRIPTION OF THE FIGURES

Attention is now directed to several figures that aid in understanding the present invention.

Figure 1:
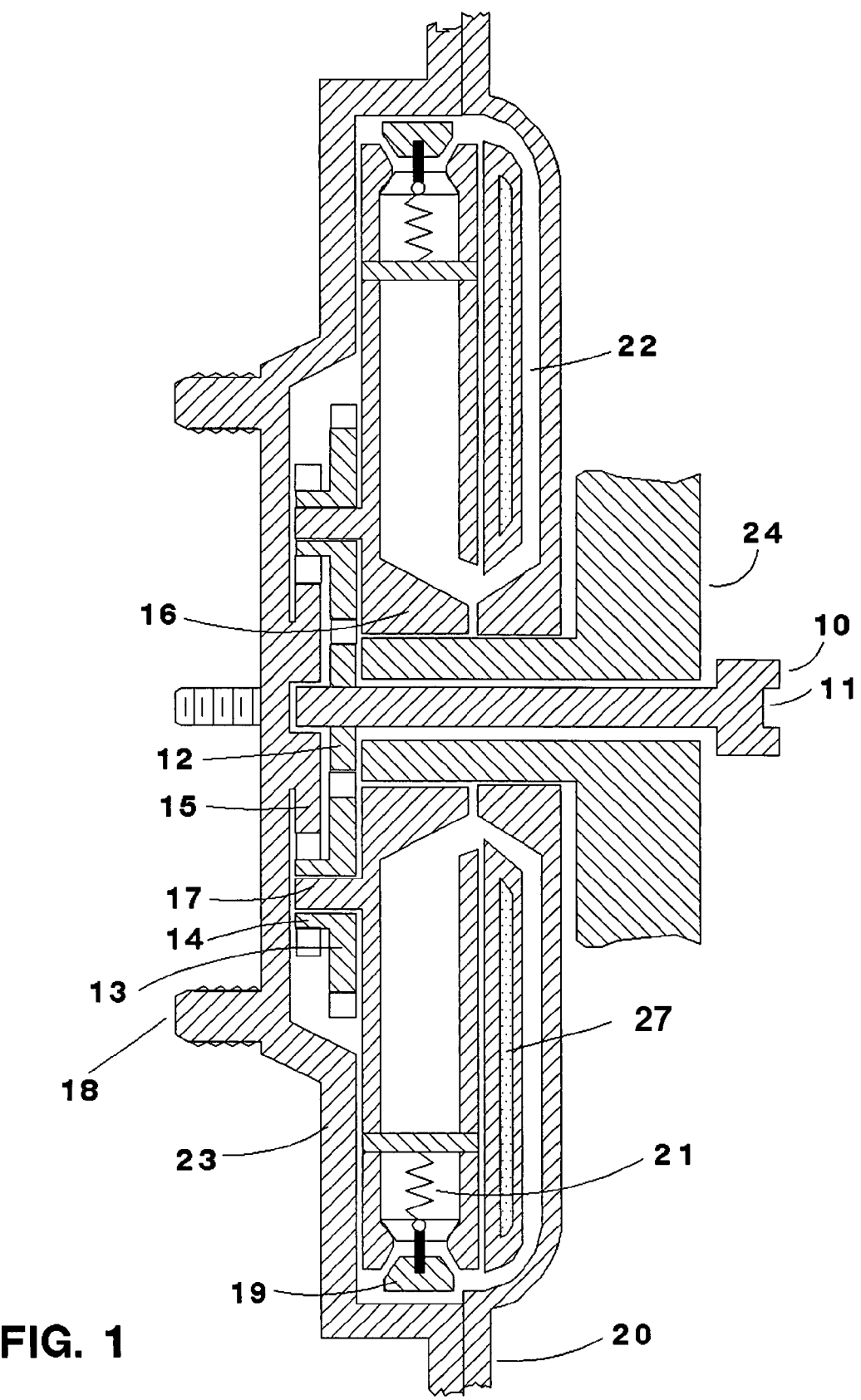
FIG. 1 is a sectional view of an embodiment of a wheel-mounted transmission.

Several drawings and illustrations have been presented to aid in understanding the invention. The scope of the present invention is not limited to what is shown in the drawings.

DESCRIPTION OF THE INVENTION

The present invention provides a separate, individual, automatic transmission for each road wheel, independently connected to a drive shaft so that each wheel acts without regard to the requirements of the other road wheels. With exception of some type of manual reversing system, a brake, and a throttle pedal, no manually operated clutches, shift levers, or differential gearing is required. Connection of each driven wheel shaft to the engine shaft can be made by bevel gears of the desired ratio and/or through the use of universal couplings.

The present invention is not limited to use with automobiles and trucks, but could be used for bicycles, golf carts or any other type of vehicle where speed changing without shifting is desired. Although spur (or spiral) gears are shown herein, V-belts or chain and sprockets could be substituted for gears.

Some of the particular advantages of the present invention over the prior art are:
1. Cheaper manufacturing costs,
2. Easier access for repair,
3 Continuous 4 wheel traction,
4. Improved steering,
5 Conventional differential not needed,
6 Sensing devices not required,
7 Elimination of pedals and shift sticks.

Since all wheels are drive wheels of like design, they can be suspended similarly, differing only where weight distribution is a concern. Therefore steering rods could be adapted to rear wheels as well as to front wheels so that the axles of all wheels can be aligned to the turning radius. Presently the inability of such alignment is a problem with 4 wheel vehicles.

Turning to FIG. 1, a cross section of a drive wheel transmission along a vertical plane of the axle can be seen.

The figures show particular gear ratios: gear 12 to gear 13 to be 1 to 2, and gear 14 to gear 15 to be 1 to 2, resulting in an overall maximum speed reduction of 4 to 1, or a torque ratio of 1 to 4, but a manufacturer can select any ratio desired, depending on the use to which the vehicle is to be put. For clarity, bearings, and methods of fastening components that are joined, are not shown being conventional and well known in the art.

Figure 3:
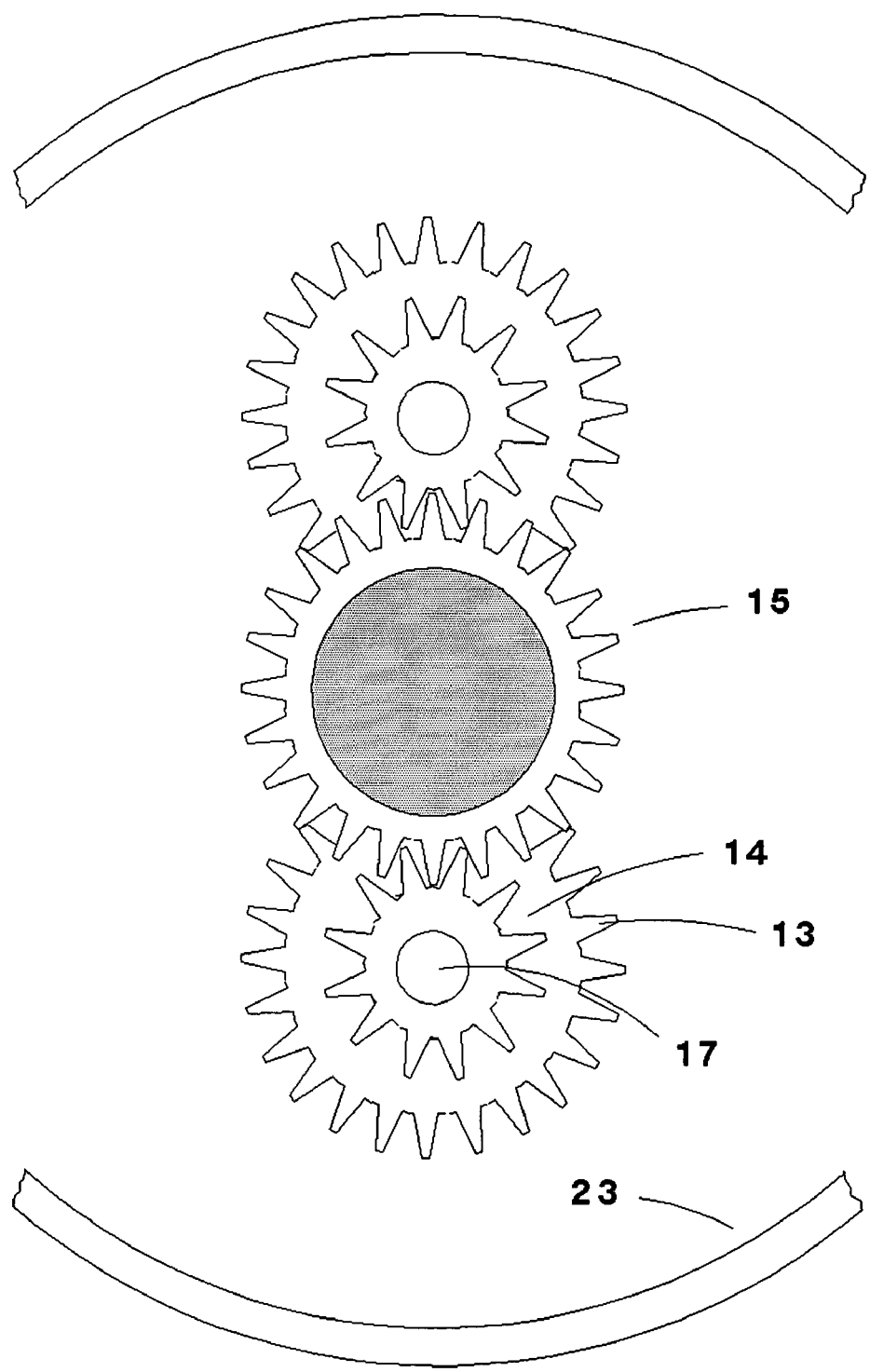
FIG. 3 shows a particular gear arrangement in an embodiment of the invention.

Referring to FIG. 1, coupling half 10 is coupled to the drive shaft of a power source not shown. The coupling 10 is fixed to a shaft 11 which rotates when driven by the power source. The shaft 11 has a sun pinion gear 12 fastened to it so that rotation of the shaft 11 also rotates the pinion gear 12. The sun gear 12 is meshed with a planetary spur gear 13, which is fixed to the planetary spur gear 14. These gear relationships are shown for clarity in the plane of the wheel in FIG. 3. Although only one planetary gear 13 need be meshed with the sun pinion gear 12, more can be installed to provide balance, additional strength and more gear tooth surface. FIGS. 1 and 3 show two. The gears 13 and 14 are joined and rotate about an axle pin 17 so that the planetary gears 13 and 14 rotate in unison. The planetary gear 14 meshes with a driven sun gear 15 which is fixed to a housing 23. The carrier 16 carries the pin 17 with the two planetary gears 13, 14, restraining the planetary gears 13 and 14 in orbit about the sun gear 12.

A valve disk 19 of selected mass rotates with carrier 16 and is retained by a spring 21 opposing the centrifugal force of the disk 19 caused by the rotation of the carrier 16. The carrier 16 has impeller vanes 25 which can be cast integral with the carrier 16. Ducts 22 direct oil return to an impeller suction and aid oil cooling. When the vehicle is stopped, oil 26 gravitates to the bottom of wheel housing 23 formed by the enclosure of the gear train. The housing extension 20 can terminate in a drum or disc for a vehicle braking surface. The tire and rim, not shown, can be attached by lugs 18 to the housing 23. A strut 24 provides suspension for the housing 23 to attach the components of the drive wheel to the vehicle. Components for turning and shock known in the art should also be provided.

Power is normally transmitted from a pinion sun gear to planetary gears and from these planetary gears to a driven sun gear in a way that allows the planetary gears to orbit the sun gears while the pinion is rotating without rotating the driven sun gear if this gear is braked. If the driven sun gear 15 is prevented from rotating, and the planetary gears are free to rotate and orbit, they will orbit in a rotational direction opposite to the driving sun gear 12. The orbital velocity of the carrier 16 and the planetary gears 13 and 14 with respect to the driven sun gear 15 will depend on the overall gear ratios selected (in the case of ratios here shown, the gear 12 will rotate 3 revolutions for each counter revolution of the carrier 16). For the vehicle to travel at a constant velocity when all components are free to move the torque applied to the drive shafts must equal the opposing torque on the road wheel shafts caused by road friction. Therefore if the drive shaft power is unchanged, an increase in road wheel friction tends to rotate the planetary carrier opposite to the drive shaft causing the transmission to gear down.

Performance is as follows: On start up, if the vehicle is braked with the engine at idle speed, the planetary gears will be orbiting in a direction opposite to the driving shaft and at a rotational velocity which is the resultant of engine idle speed and the selected gear ratios. Spring tension on the disc 19 can be set to close to that of the liquid outlet portal of the carrier 16.

To introduce the vehicle into motion, the operator releases the brake and depresses the accelerator to supply more power to the engine. The rotational velocity of the drive shaft 11 will increase tending to increase the backward velocity of the planetary carrier 16 with it's orbiting gears. Inertial resistance to the carrier rotation will effect a gear down ratio in the transmission train. With a four wheel drive system, only ¼ of the power required to start the vehicle need be supplied by each wheel. If this is insufficient to move the vehicle, the carrier 16 will continue to gain rotational velocity until the centrifugal force of combined liquid and disc weight overcomes the retaining spring tension resulting in a pumping load which slows the carrier 16 with respect to the shaft 11. This results in an increase of rotational torque transmitted by the train and, if engine power is adequate, putting the vehicle into motion. As the speed of the vehicle increases the backward rotation of the planetary carrier 16 relative to the road wheel and relative to the ground will differ, approaching near zero to the road wheel and a forward rotation relative to the ground. Finally, at some speed, the disc 19 will contact drum surface of housing 23 so that the drive shaft 11, planetary carrier 16, and the road wheels rotate almost as a unit, although capable of yielding somewhat to variations in road conditions. At cruising speed, the centrifugal force will maintain a liquid level distributed within the periphery of the wheel housing drum 23. Thus the force of the rotating oil particles plus friction (19 onto 23) will encourage the carrier 16 to rotate at the velocity of the road wheel.

The weight of the orbiting components can be increased above what is required for structural strength if desired for the purpose of increasing the momentum of the orbiting masses.

This will give the operator better control of pick-up because acceleration of the engine greater than the orbiting planetary system can accelerate will have the effect of slowing the reverse orbital rotation of the carrier 16, and thus gearing down the drive train.

Deceleration when power is decreased will result in the road wheels driving the engine. The amount of braking caused by this deceleration can be controlled by the gas pedal. This effect can be (and will be) defeated if the manufacturer uses a one-way clutch in the drive train.

The amount of torque applied to any given wheel is determined by the difference in road wheel rotational velocity to that of the engine shaft. Therefore, if no change in engine power is made, any force tending to slow any one wheel will tend to increase the torque applied to that wheel, the resultant decrease in velocity of the engine shaft being shared by the other wheels. On the other hand, if one wheel has no traction (slipping or jacked up), this wheel will rotate at the same RPM as it's drive shaft; however, the other wheels will each still depend on the drive shaft RPM relative to it's road wheel RPM regardless of the RPM of the tractionless wheel. At cruising speed there is little relative rotation of the enclosed gears so that splash lubrication should be adequate.

Any force that tends to retard rotation of the carrier with respect to the wheel hub exerts a force by way of the planetary gears tending to rotate that wheel hub. There are at least three forces that can act to retard rotation of the carrier.

1. Load on the centrifugal pump (part of the carrier). The faster it goes, the more liquid it has to pump.
2. Friction between outer valve surface and inner housing drum. Contact takes place at an elevated velocity with respect to ground.
3. Inertia (which does not actually slow the carrier, but acts to prevent carrier acceleration when engine acceleration takes place).

Figure 2:
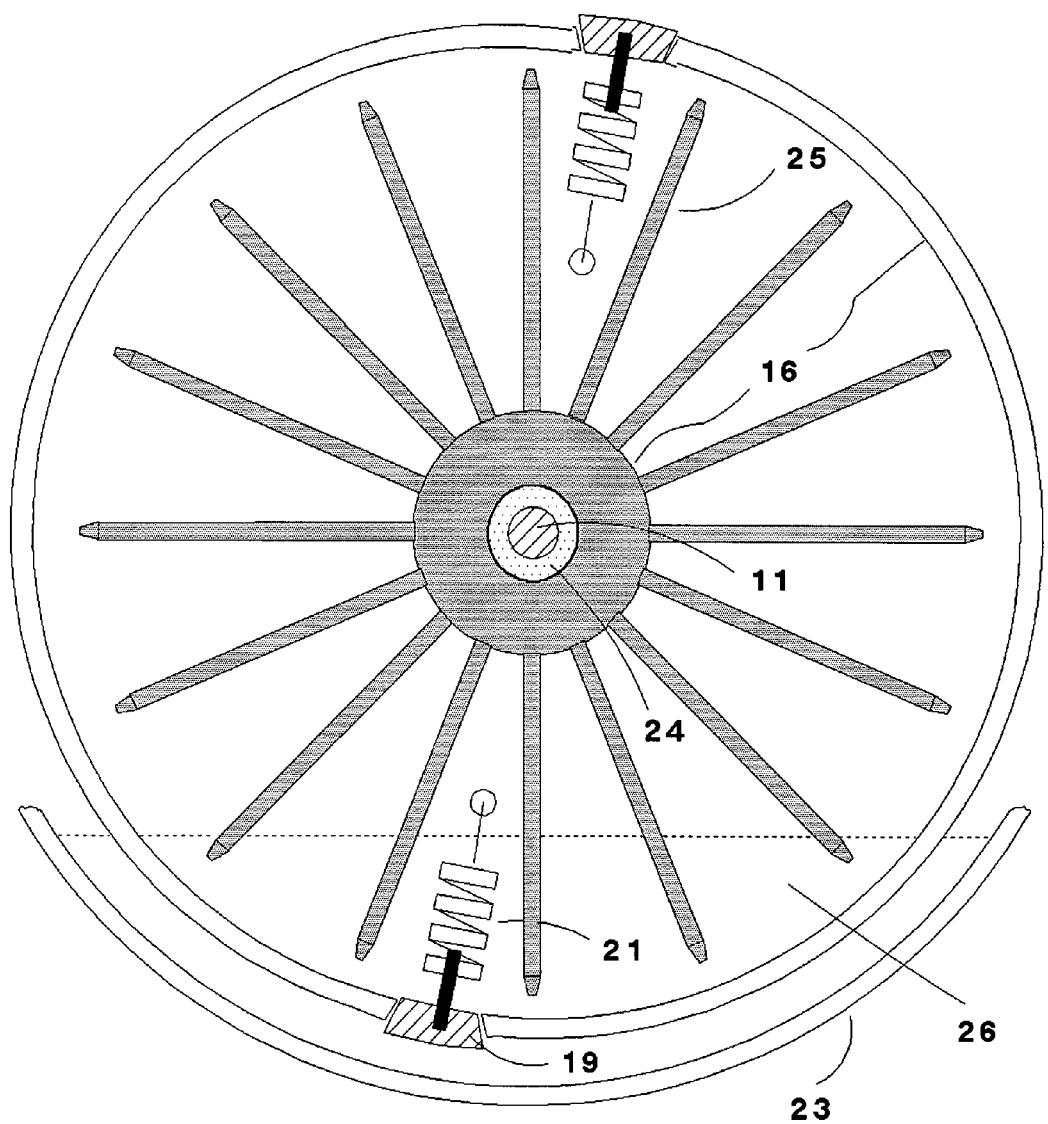
FIG. 2 is a cross section of the planetary carrier along a plane perpendicular to the axle showing positioning of spring loaded valve discs.

FIG. 2 shows the housing 23 with a liquid level 26 within the housing with the unit at rest. This quantity of liquid is critical; however, it differs for each design. If there are no seal or other leaks, the liquid, once charged, stays indefinitely in the housing. The preferred liquid is lubricating oil so that it can lubricate the gears and bearings, but it could be a different liquid if the gears and bearings are self lubricated. Any liquid is within the scope of the present invention. The liquid can be loaded through any convenient hole in the housing that can be plugged. When the vehicle is braked, and the engine is started, the carrier will begin to rotate causing the liquid to splash about until it soon enters the carrier pump suction where, due to centrifugal force, it will accumulate in the outer section of the carrier until rotational velocity above idle speed causes the valves, abetted by liquid weight, to overcome spring tension and open.

FIG. 3 shows a front, cut-away view of the gears previously described. In particular, the driven sun gear 15, the planetary gears 13 and 14 and the axle pin 17 can be seen, all mounted in the housing 23. While the arrangement of gears shown in FIG. 3 is preferred, numerous other arrangements and orientations are within the scope of the present invention.

Several descriptions and illustrations have been provided to better aid in understanding the present invention. One skilled in the art will recognize that numerous changes and variations are possible without departing from the spirit of the invention. Each of these changes and variations is within the scope of the present invention.

I claim:

1. A wheel mounted automatic transmission comprising:
   a wheel housing containing a predetermined amount of liquid, said housing having an inner drum surface;
   a drive shaft entering said housing coupled to at least one planetary gear, said planetary gear having inertia and rotating in a direction opposite to that of said drive shaft;
   a carrier coupled to said planetary gear that rotates with said planetary gear;
   and wherein during rotation of said drum surface, said liquid becomes distributed around said drum surface, said liquid causing said drum surface and said wheel housing to rotate; and,
   two spring loaded valve disks coupled to said carrier, said disks moving radially under centrifugal force, and wherein at a first particular rotational velocity, said valve disks open and at a second particular rotational velocity, said valve disks contact said inner drum surface.

2. The wheel mounted automatic transmission of claim 1 further comprising two planetary gears.

3. The wheel mounted automatic transmission of claim 2 wherein said two planetary gears are located opposite one another with respect to said power driven shaft.

4. The wheel mounted transmission of claim 1 wherein said spring loaded valve disks are located opposite one another.

5. The wheel mounted automatic transmission of claim 1 wherein said liquid is oil.

\* \* \* \* \*